INVENTOR.
Peter P. Duncanson

United States Patent Office 3,036,643
Patented May 29, 1962

3,036,643
PLOW ATTACHMENT
Peter P. Duncanson, Caro, Mich., assignor to Marlex Manufacturing Company, Caro, Mich., a corporation of Michigan
Filed Feb. 26, 1959, Ser. No. 795,754
5 Claims. (Cl. 172—736)

This invention relates to farm implements and more particularly to an attachment for use in conjunction with a plow-share for the purpose of enabling cover crops, trash and litter on a field to be turned underground as the field is plowed.

A field to be plowed quite often contains a cover crop or quite an accumulation of trash in the form of leaves, sticks, stones, and stalks of previously harvested crops on its upper surface. If this material is permitted to remain on the surface of the field it may interfere with the planting and cultivation of subsequent crops. Accordingly, it is an object of this invention to provide a plow attachment which is capable of effectively turning material of the kind mentioned underground during the plowing of the field.

Another object of the invention is to provide a trash covering attachment for a plow which is substantially universally adjustable relatively to the plow so as to permit its use with all kinds of soil and under all plowing conditions.

A further object of the invention is to provide an attachment of the kind referred to which is quite simply mounted on and adjusted relatively to the plow.

Still a further object of the invention is to provide a trash covering plow attachment which is so constructed as to be capable of functioning effectively to turn under all kinds of trash, stalks, and cover crops, while not hampering the turning of the furrow slice.

Other objects and advantages of the invention will be referred to specifically or will become apparent from the following description when it is considered in conjunction with the appended claims and the accompanying drawings, in which:

Figure 1:
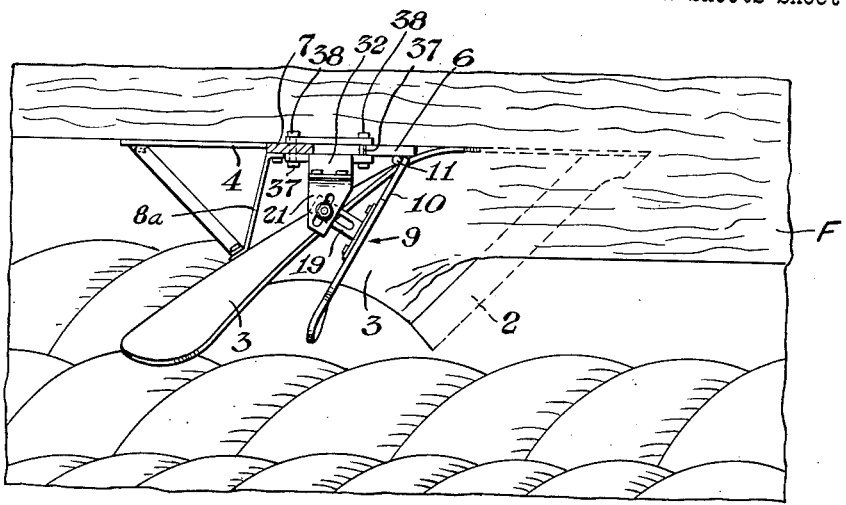
FIGURE 1 is a top plan view, partly in section, illustrating the plowing of a field with a plow having an attachment constructed in accordance with the invention.

Apparatus constructed in accordance with the invention is adapted for use in conjunction with a conventional plow 1 having a plowshare 2 mounted on a concave moldboard 3 in any suitable and conventional manner. The plow also may be equipped with a rearwardly extending landslide 4 braced by a suitable brace bar 5. The plowshare mounting means comprises a mounting bracket 6 connected in a conventional manner to a plow beam or frog member 7 mounted on a draw bar 8 in a known manner, and the moldboard 3 may be braced from the frog 7 by a suitable brace bar 8a.

Figure 2:
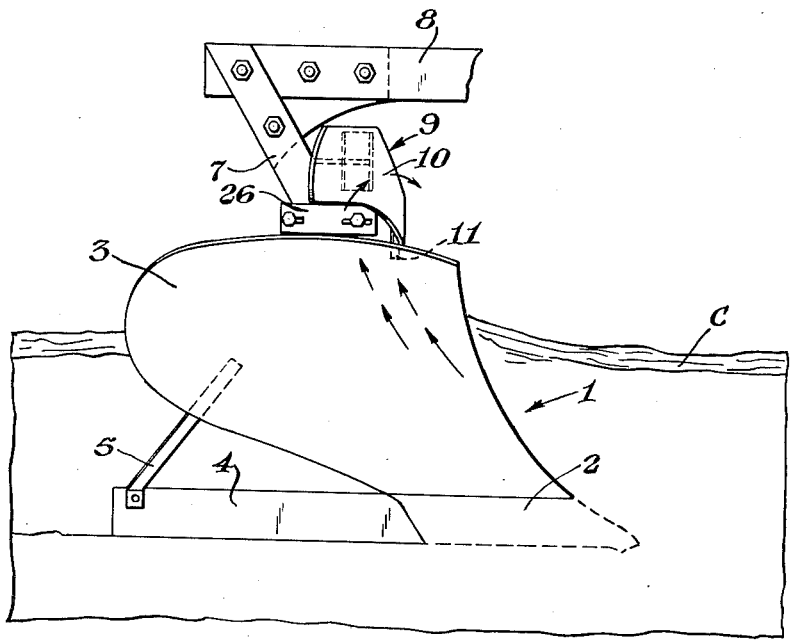
FIGURE 2 is a side elevational view of the apparatus shown in FIGURE 1.
Figure 3:
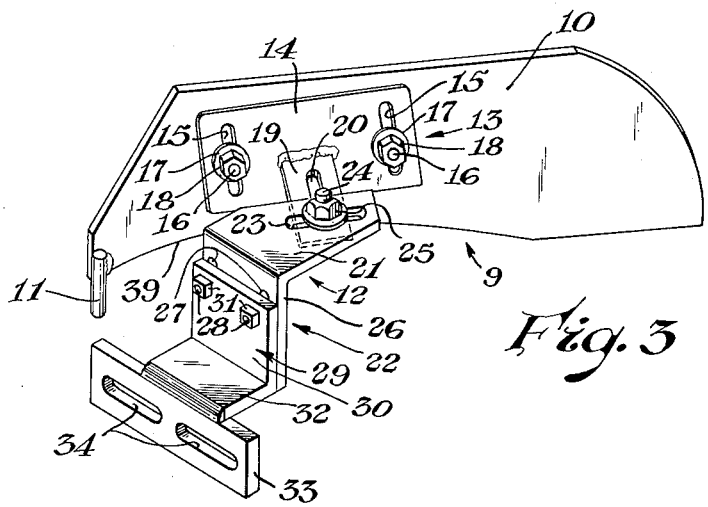
FIGURE 3 is a rear elevational view of the attachment and a portion of its mounting means.

An attachment constructed in accordance with the invention is indicated generally by the reference character 9 and comprises a slightly concave plate member 10 mounted above the upper edge of the moldboard 3 and having welded or otherwise secured adjacent to its leading end a locating device 11 which, in the preferred embodiment of the invention, comprises a pin which is cylindrical so as to present an arcuate surface to the moldboard. The pin 11 projects below the lower edge of the plate 10 and is adapted to engage the rear face of the upper edge of the moldboard 3 as is best shown in FIGURE 2. The plate 10 is mounted with the lower edge of its leading end resting on the upper edge of the leading end of the moldboard 3 to form a smooth continuation of the latter, as is shown in FIGURE 2, and extends laterally from the plane of the frog 7 in the same general direction as does the moldboard 3, but at an angle to the latter, as is best shown in FIGURE 1, so that the trailing end of the plate 10 is forwardly located with respect to the trailing end of the moldboard. The angularity of the plate 10 to the moldboard 3 will be determined by several factors such, for example, as the kind of plowing being done, the kind of soil being plowed, and the kind of trash or cover crop on the surface of a field. In order to enable the attachment 9 to function most efficiently under all conditions, it is preferred that the plate 10 be mounted for substantially universal adjustment relatively to the plow 1.

A preferred embodiment of universally adjustable mounting means is designated generally by the reference character 12 and comprises a first bracket member 13 composed of an attaching plate 14 having a pair of elongate slots 15 therein adapted to receive a pair of correspondingly spaced bolts 16 welded or otherwise suitably fixed to the rear surface of the plate 10. The bracket 13 may be adjustably fixed to the member 10 by means of washers 17 and nuts 18 received on the bolts 16. Welded or otherwise suitably secured to the rear surface of the plate 14 is an attaching arm 19 which is provided with an elongate slot 20 therein. The attaching plate 19 is adapted to be placed in face-to-face engagement with one leg 21 of a second, right angular bracket member 22, the leg 21 having an elongate slot 23 therein extending transversely to the slot 20. A bolt 24 is adapted to be inserted in the slots 20 and 23 to couple the members 13 and 22 together, and the members 13 and 22 may be maintained in a selected position of adjustment by means of a nut 25 threaded on the end of the bolt 24. The second leg 26 of the bracket 22 is provided with a pair of spaced, elongate slots 27 through which extends a pair of bolts 28 projecting from a third bracket element 29. The bracket element 29 also is of substantially right angular configuration and includes a leg 30 in face-to-face engagement with the leg 26 of the bracket 22, the parts 22 and 29 being maintained in selected positions of adjustment by means of nuts 31 threaded on the ends of the bolts 28.

The bracket element 29 includes a horizontal leg 32 which is welded at its outer end to a mounting plate 33, the latter having a pair of slots 34 therein in alignment with a pair of slots 35 formed in a companion mounting plate 36. The plate 33 is adapted to be placed on one side of the frog member 7 and the plate 36 on the other side of the frog, and the two plates 33 and 36 may be drawn together by means of the bolts 37 and nuts 38 so as removably to mount the trash covering apparatus on the frog 7.

When the trash covering apparatus has been mounted in the manner described, fore and aft adjustment of the plate 10 with respect to the direction of travel of the plow may be obtained because of the slots 34 and 35 in the mounting plates 33 and 36. Vertical adjustment of the plate 10 may be effected either by relative movement between the plate 10 and the mounting plate 14, due to the provision of the slots 15 in the latter, or by relative adjustment of the bracket members 22 and 29. Lateral movement of the plate 10, that is, movement towards and away from the plane of the frog 7, may be obtained by relative movement of the arms 19 and 21, this movement being possible because of the slot 23 in the arm 21.

In addition to the adjustments described, the trailing end of the plate 10 may be swung through an arc having its center at the location of the pin 11 by loosening the nut 25 and swinging the member 10 as permitted by the slot 20 in the arm 19. The arcuate configuration of the pin 11 will permit swinging of the plate 10 without affecting the relative positions of the leading ends of the plate and the moldboard. Furthermore, the plate 10 may be rocked in a vertical plane by loosening the nuts 18 and rocking the plate 10 as permitted by the slots 15 in the mounting plate 14. Moreover, the plate 10 may be rocked about a substantially horizontal axis by loosening the nuts 28 and rocking the bracket member 22 as permitted by the slots 27.

As a result of the multiple adjustments capable of being effected among the several bracket members, the plate 10 is universally adjustable relatively to the moldboard 3 so as to enable placement of the plate 10 in its most efficient position for the particular kind of plowing to be done and with respect to the kind of trash or cover crop on the surface of the field.

In the operation of the apparatus, the plow 1 will be drawn through a field F by a tractor or the like in the conventional manner to turn the earth. A slice of earth, together with its cover crop C or other trash, will slide upwardly and outwardly along the moldboard 3 and the cover C or trash will be moved upwardly until it is engaged by the plate 10 and tumbled forwardly, as is indicated by the arrows in FIGURE 2, so as to lie in the path of earth being turned by the moldboard 3. The rocking force thus exerted on the plate 10 will be counteracted by the mounting bracket members and also by the locating pin 11, so as to prevent inadvertent adjustment of the plate 10.

Figure 4:
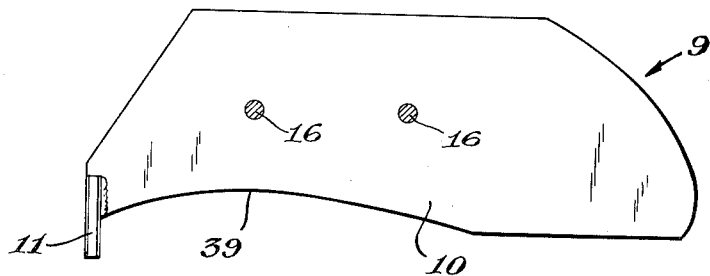
FIGURE 4 is a rear elevational view of the attachment per se.
Figure 5:
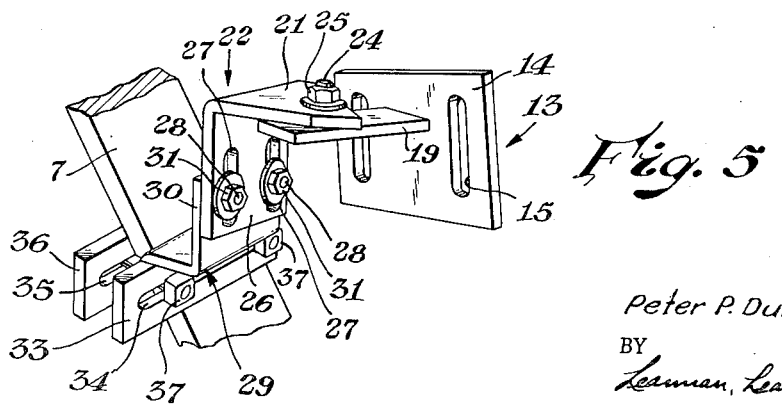
FIGURE 5 is a perspective view of the attachment mounting means.

As is perhaps best shown in FIGURE 4, the lower edge of the plate 10 is recessed intermediate its ends as at 39 to provide an increased throat area between the lower edge of the plate 10 and the upper edge of the moldboard. The purpose of the throat is to minimize the possibility of earth and/or trash clogging the area between the moldboard and the plate and thereby hampering the turning of the earth.

The disclosed embodiment is representative of a presently preferred form of the invention, but is intended to be illustrative rather than definitive thereof. The invention is defined in the claims.

I claim:

1. An attachment for a plowshare having a moldboard with a leading end and a trailing end and means mounting said plowshare on a plow beam, said attachment comprising a plate member having a leading end and a trailing end, said leading end of said plate member being adapted for location adjacent to the leading end of said moldboard and above the latter, and the trailing end of said plate member being adapted to be positioned forwardly of said moldboard in the direction of movement of said plowshare; a locating device secured to said plate member at its leading end and adapted to be positioned rearwardly of said moldboard in engagement therewith, said device presenting an arcuate surface to said moldboard so as to enable swinging of said plate member in an arc having a center at said device without affecting the position of the leading end of the plate member relative to said moldboard; and universally adjustable means mounted on said plate member and independent of said plowshare mounting means for universally adjustably mounting said plate member on said plow beam.

2. The attachment set forth in claim 1 wherein the lower surface of said plate member is recessed intermediate its ends from a point at the leading end of said member to provide an enlarged throat area between said plate member and said moldboard.

3. The attachment set forth in claim 1 wherein said adjustable means comprises a first bracket member adjustably connected to said plate member and a second bracket member adjustably connected to said first bracket member and wherein the second bracket member is linearly and rockably adjustable relatively to said first bracket member in a plane substantially normal to the plane of adjustment of said first bracket member relative to said plate member.

4. The combination with a plowshare having a moldboard with a trailing end and a leading end and means mounting said plowshare on a plow beam, of an attachment for use with said moldboard in turning trash under soil as said plowshare is drawn through a field, said attachment comprising a plate member having a leading end and a trailing end, said leading end being located adjacent to and above the leading end of said moldboard; a positioning device mounted on said plate member at the leading end thereof and depending therefrom for engagement with the rear face of said moldboard, said device presenting an arcuate surface to said moldboard so as to enable said plate member to be swung in an arc having a center at said device without affecting the position of the leading end of said member relative to said moldboard; and universally adjustable means independent of said plowshare mounting means interconnecting said plow beam and said plate member and mounting the latter on said plow beam for adjustment of said trailing end of said plate member towards and away from the trailing end of said moldboard.

5. The combination set forth in claim 4 wherein said adjustable means is adjustable in a plurality of planes so as to enable substantially universal adjustment of said plate member about said locating device.

References Cited in the file of this patent

UNITED STATES PATENTS

| | | |
|---|---|---|
| 234,251 | Currier | Nov. 9, 1880 |
| 870,319 | Schimanoski | Nov. 5, 1907 |
| 2,672,805 | Longenbach | Mar. 23, 1954 |
| 2,829,580 | Bauer | Apr. 8, 1958 |
| 2,907,397 | Murer | Oct. 6, 1959 |